United States Patent [19]

Thomas

[11] Patent Number: 4,942,387

[45] Date of Patent: Jul. 17, 1990

[54] APPARATUS AND METHOD FOR TOOL BREAK AND WEAR DETECTION

[75] Inventor: Charles E. Thomas, Scotia, N.Y.

[73] Assignee: General Electric Company, Schenectady, N.Y.

[21] Appl. No.: 402,600

[22] Filed: Sep. 5, 1989

[51] Int. Cl.$^5$ .............................................. G08B 21/00
[52] U.S. Cl. ...................................... 340/683; 73/660; 340/680
[58] Field of Search ................... 340/683, 680; 73/660

[56] References Cited

U.S. PATENT DOCUMENTS

| | | | |
|---|---|---|---|
| 4,636,779 | 1/1987 | Thomas et al. | 340/680 |
| 4,636,780 | 1/1987 | Thomas et al. | 340/680 |
| 4,642,617 | 2/1987 | Thomas et al. | 340/680 |
| 4,831,365 | 5/1989 | Thomas et al. | 340/680 |
| 4,849,741 | 7/1989 | Thomas | 340/683 |

Primary Examiner—Glen R. Swann, III
Attorney, Agent, or Firm—James C. Davis, Jr.; Paul R. Webb, II

[57] ABSTRACT

A device for determining cutting tool wear and breakage has an accelerometer for sensing tool vibrations. Functions of the AC and DC power of the vibration signal, such as the powers themselves or the square root of the powers, are computed and compared. If the relationship between the AC and DC power changes beyond selected limits, an alarm is sounded or flashed. A method for determining cutting tool wear and breakage provides a tool vibration signal, computes functions of the AC and DC power of the vibration signal, and compares the AC and DC power signals.

24 Claims, 3 Drawing Sheets

APPARATUS AND METHOD FOR TOOL BREAK AND WEAR DETECTION

BACKGROUND OF THE INVENTION

The present invention relates to a machine tool monitor (MTM), and more particularly, to an MTM that not only reliably detects tool breaks, but also detects tool wear.

MTMs are shown in U.S. Pat. Nos. 4,636,779, 4,636,780, 4,642,617, and 4,849,741 wherein a tool vibration signal is detected and filtered (averaged) and changes in the mean of the resulting signal are used to detect breakage of the tool. This has been found adequate for reliable detection of the ceramic tool breakage when cutting hard materials, e.g., aircraft engine alloy steel. However, this method is not very reliable when a ceramic cutting tool is lightly cutting such an alloy, or when cutting is performed on ordinary steel alloys with such a tool. In these applications a tool break may produce only a small abrupt shift in the vibration signal that cannot be distinguished from the relatively small abrupt shifts in the mean caused by normal occurrences that do not indicate any tool problems. Further, such MTMs can have difficulty in detecting excessive tool wear, which causes a gradual change in mean vibration signal level similar to the change that can result from normal cutting with increasing depth of cut.

It is therefore an object of the invention to provide apparatus and method for reliably detecting not only tool breaks but also tool wear for various types of cutting tool.

SUMMARY OF THE INVENTION

Apparatus in accordance with the invention for determining the condition of a tool comprises means for sensing the vibration of the tool to provide a vibration signal having AC and DC power components; means for computing a first signal that is a function of said DC power component of said vibration signal; means for computing a second signal that is a function of said AC power component of said vibration signal; and means for comparing said first and second signals.

A method in accordance with the invention for determining the condition of a tool comprises providing a vibration signal by sensing tool vibration; computing a first signal that is a function of the DC power of said vibration signal; computing a second signal that is a function of the AC power of said vibration signal; and comparing said first and second signals.

DETAILED DESCRIPTION

Figure 1:
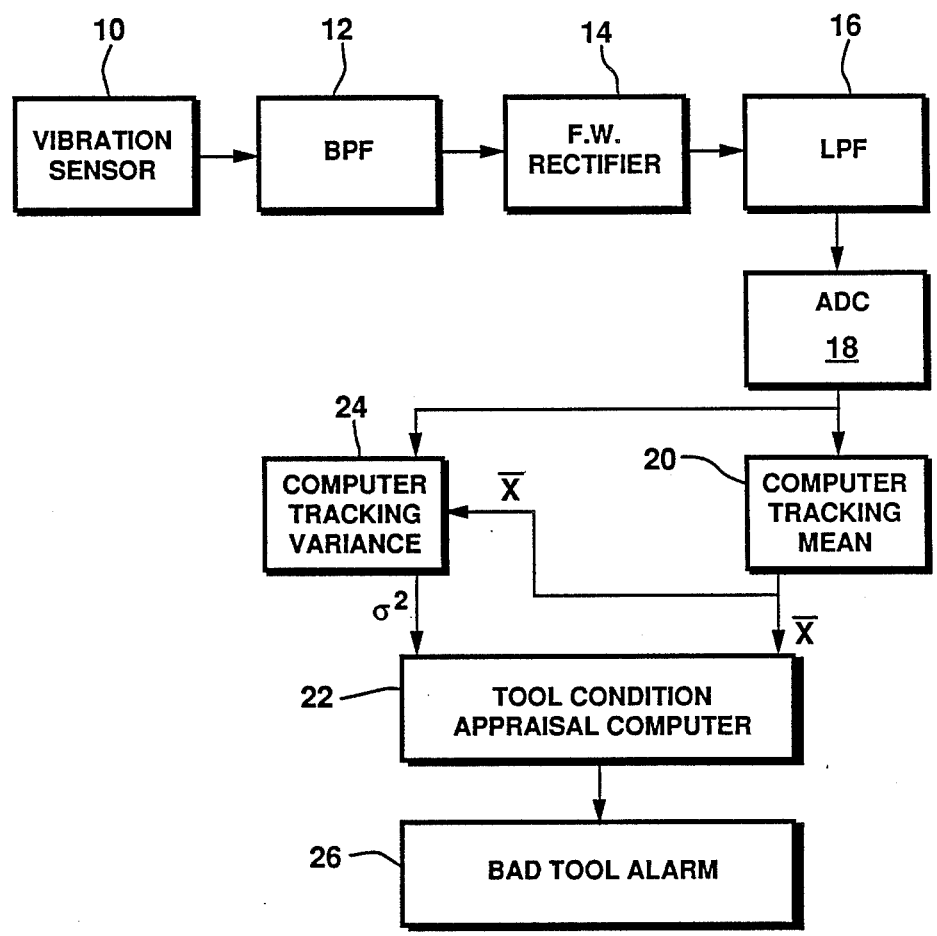
FIG. 1 is a block diagram of the invention.

In FIG. 1 is shown a vibration sensor, such as an accelerometer 10, which is mounted on or proximate a tool (not shown) as disclosed in said patents, and which has a bandwidth of from, e.g., 5 Hz to 70 KHz. In a particular embodiment, a Vibrametrics type VM 1018, made by Vibra-Metrics, Inc., Hamden, Conn., was used. This accelerometer when mounted has a resonant frequency of about 60 KHz and useful response up to about 70 KHz. Other accelerometers can be used. The output signal from sensor 10 is applied to a band pass filter (BPF) 12, which has a passband generally selected to pass frequencies indicative of abnormal tool conditions, e.g., a broken or worn tool, and reject frequencies indicative of normal machining and background noise. Typically, this passband is between about 30 to 70 KHz although other passbands can be used depending upon the material of the tool and workpiece, the cutting speed, etc. The signal from BPF 12 is applied to an energy detector comprising a full wave (FW) rectifier 14 and a low pass filter (LPF) 16. An FW rectifier is preferred since it has a high sensitivity; however, other types of rectifiers, e.g., a half wave rectifier, can be used. In turn, the unipolar output from rectifier 14 is applied to low pass filter (LPF) 16, which typically has a cut-off frequency of about 500 Hz. The output signal from LPF 16, which has a time varying amplitude representative of the varying energy in the signal from BPF 12, is applied to an analog-to-digital converter (ADC) 18, which has a typical sampling frequency of about 2 KHZ. It will thus be appreciated that LPF 16, in addition to its function as part of the energy detector, is an anti-aliasing filter for ADC 18. If desired, these functions can be performed by separate LPFs. Other frequencies can be used for the cut-off frequency of LPF 16 and the sampling frequency of ADC 18; however, the cut-off frequency of LPF 16 should be no greater than one half the sampling frequency of ADC 18.

The digital signal from ADC 18 is applied to a tracking computer 20 that computes the mean value of the signal, which is proportional to the square root of the DC power value. Thus a signal that is a function of the DC power of the digital signal is provided by computer 20 to a comparison means, such as a tool condition appraisal computer 22, and also to a tracking computer 24. Similarly, the digital signal from ADC 18 is applied to computer 24 that computes the average of the square of the difference of the samples and the mean value. Thus a signal that is a function of the AC power or variance of the digital signal is provided to computer 22.

It has been found that by supplying a signal to computer 22 that is a function of the AC power (variance) in addition to that of a signal that is a function of the DC power (mean), a more reliable indication of tool breakage and an indication of tool wear is obtained. The output signal from appraisal computer 22 actuates an audio and/or visual alarm 26 so that an operator can shut off the machine using the tool. An automatic shut down circuit can also be used.

Figure 2:
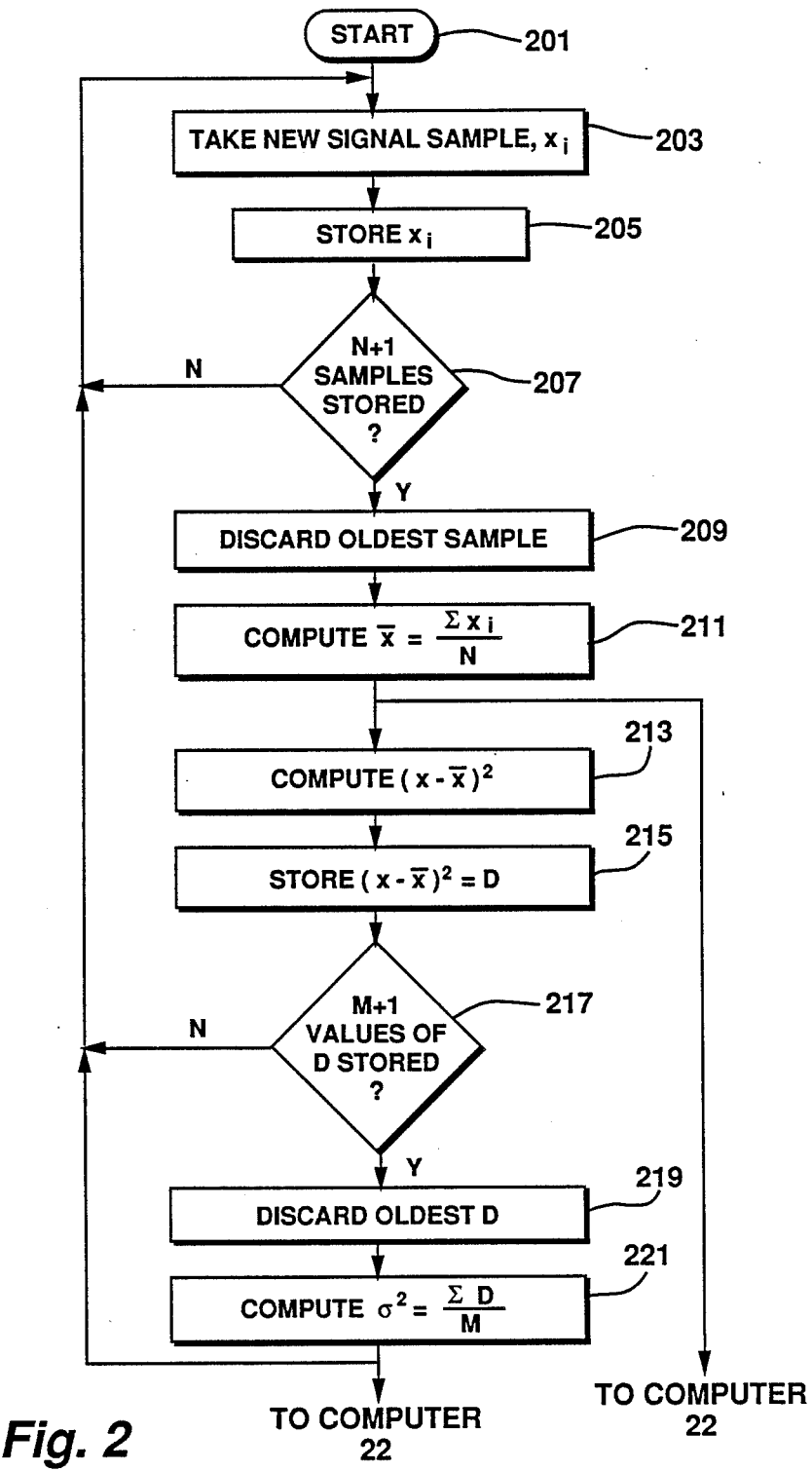
FIG. 2 is a flow chart of one possible embodiment of the programming of tracking computers used in FIG. 1.

In FIG. 2, the programming of computers 20 and 24 is shown with the START of the program shown by a terminal block 201. Then a new signal sample ($x_i$) is taken in at the sampling rate, e.g., 2 kHz, as indicated by a process block 203 and stored as indicated by a process block 205. Next, a decision block 207 decides if N+1 samples have been stored. If the answer is NO, then the program loops back to process block 203 until N+1 samples are stored, i.e., the answer to block 207 is YES. Then the oldest (furthermost back in time) sample is discarded as indicated by process block 209. Next the mean ($\bar{x}$) is computed for the remaining N samples, as indicated by process block 211. The mean value (DC power) is applied to computer 22.

The mean value is also applied to process block 13 wherein the square of the difference (deviation) between the mean value ($\bar{x}$) and the current sample (x) is computed. Next, as indicated by process block 215, the difference (D) is stored. Decision block 217 shows that a check is made to see if M+1 values of D are stored, wherein typical values of both N and M are between about 16 to 64, although other values can be used. If the answer is NO, then the program loops back to process block 203. When the answer is YES, the oldest value of D is discarded as indicated by process block 219. Then the mean value of $\sigma^2$ (variance) of the remaining M number of values, which is the AC power, is computed as indicated by process block 221. It is noted that the first valid output of $\sigma^2$ is provided on the (N+M+2) signal sample, and thereafter valid values are provided at each sample time. The value of $\sigma^2$ is provided to computer 22 and the program loops back to process block 203.

It will be appreciated that other embodiments are possible for the flow chart of FIG. 2. For example, for computation simplicity purposes, process block 213 can be eliminated and the average value of the expression $x_i - \bar{x}$ computed which is proportional to the square root of AC power. This can be compared to $\bar{x}$ (square root of DC power). Also $\bar{x}$ can be squared to form $x^2$, which is proportional to DC power and compared to $\sigma^2$ (AC power). The comparisons are performed by appraisal computer 22.

Figure 3:
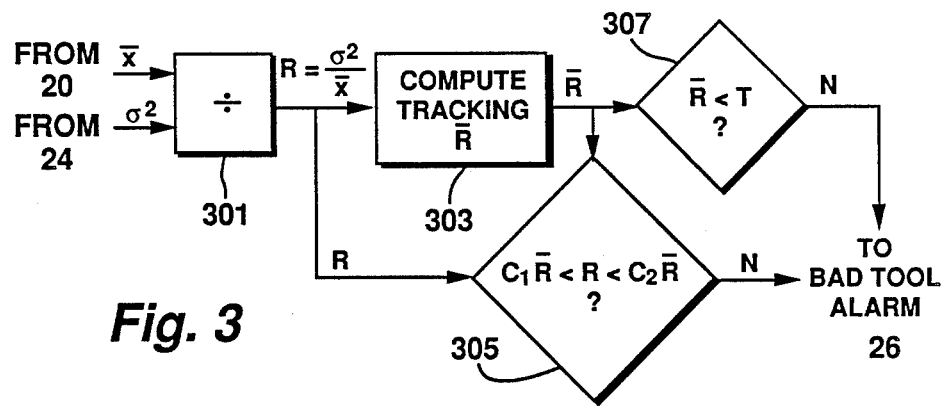
FIG. 3 is a flow chart of an embodiment of the programming of an appraisal computer used in FIG. 1.

FIG. 3 shows the flowchart of one possible embodiment of software for appraisal computer 22. The values of $\bar{x}$ and $\sigma^2$ are applied to a process block 301, which divides $\sigma^2$ by $\bar{x}$ to compute the ratio R. The value of R is applied to process block 303, which computes $\bar{R}$ the average value of R over a selected number of samples, e.g., 16 to 64, although other values can be used. The values of R and $\bar{R}$ are applied to decision block 305, wherein R is compared to see if it is greater than $C_1\bar{R}$ or less than $C_2\bar{R}$. The constants $C_1$ and $C_2$ typically are 0.5 and 2, respectively, although other values can be used. If the answer is NO, this means that R has abruptly changed compared to $\bar{R}$ which is most likely caused by tool breakage and alarm 26 is therefore actuated. The value of $\bar{R}$ is also applied to decision block 307, wherein it is compared to see if it is less that a selected threshold value T. The value of T is selected based upon prior experience with the particular tool type and material, the material being cut, the cutting speed, etc. If the answer is NO, the most likely cause is gradual tool wear, and alarm 26 is actuated.

It will be appreciated that many other embodiments are possible within the spirit and scope of the invention. For example, although computers 20, 22, and 24 have been shown as separate computers for explanatory purposes, in practice they would be a single computer, e.g., a microprocessor. Further, these computers could be replaced by their analog or digital hard wired equivalents as known in the art.

A second embodiment of a program for tracking computer 20 uses the weighted mean equation:

$$\bar{x}(t_i) = K_1 x(t_i) + K_2 \bar{x}(t_{i-1}), \text{ wherein}$$

Figure 4:
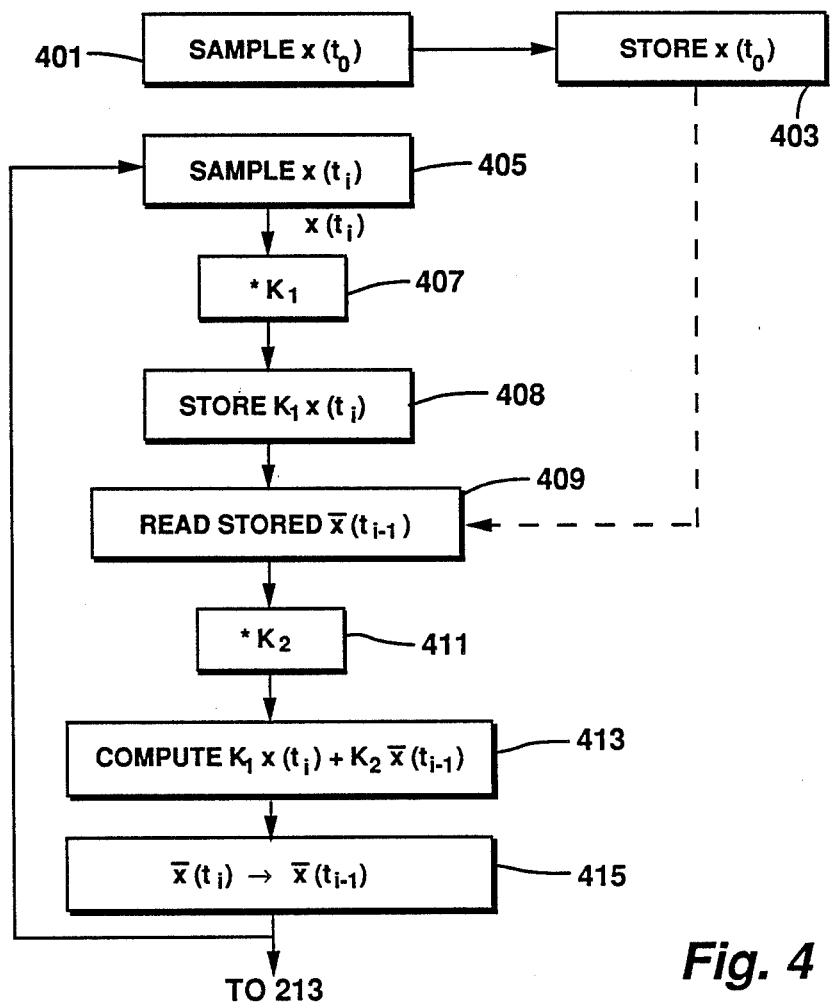
FIG. 4 is a flow chart of a second embodiment of the programming of one of said tracking computers.

$\bar{x}(t_i)$ is the current estimate of the weighted mean, $x(t_i)$ is the current sample, $\bar{x}(t_{i-1})$ is the previous mean, and $K_1$ and $K_2$ are first and second constants, respectively, such that $K_1 + K_2 = 1$. FIG. 4 is a flow chart of this program, which replaces steps 203, 205, 207, 209, and 211 of FIG. 2. As indicated by process block 401, a first sample $x(t_o)$ is sampled and then stored as indicated by process block 403. This is part of an initialization procedure as is explained below. In block 405, the current signal value $x(t_i)$, wherein i=0, 1, 2, 3, ... etc., is sampled and then multiplied by $K_1$ (block 407). The resulting product $K_1 x(t_i)$ is stored as shown by block 408.

The next step is to read the previous mean (block 409). However, for the first sample $x(t_o)$, there is as yet no previous mean. Thus, the initialization procedure is that the first sample itself, which was stored as indicated by block 403, is used as the value of the previous mean for the first sample, as shown by the dotted line. For all of the succeeding samples, a true previous mean value is present and is used. The previous mean is multiplied by $K_2$ (block 411), and then the sum $K_1 x(t_i) + K_2 \bar{x}(t_{i-1})$ computed (block 413) and this sum is $\bar{x}(t_i)$, which is then substituted for the previous mean value $\bar{x}(t_{i-1})$ as shown by block 415. The weighted mean $\bar{x}(t_i)$ is applied to step 213 of FIG. 2, and then the program loops back to block 405.

A desirable choice for the constants is $K_1 = 0.2$ and $K_2 = 0.8$, which limits a spurious or noise contaminated new signal sample from unduly influencing the average. Another choice is $K_1 = 0.8$ and $K_2 = 0.2$ in order to quickly respond to sample value changes. Still another possible choice is equal weighting, i.e., $K_1 = K_2 = 0.5$.

What is claimed is:

1. Apparatus for determining the condition of a tool, said apparatus comprising:
   means for sensing the vibration of the tool to provide a vibration signal having AC and DC power components;
   means for computing a first signal that is a function of said DC power component of said vibration signal;
   means for computing a second signal that is a function of said AC power component of said vibration signal; and
   means for comparing said first and second signals.

2. The apparatus of claim 1 wherein said sensing means comprises an accelerometer.

3. The apparatus of claim 1 wherein said first signal is proportional to said DC power.

4. The apparatus of claim 1 wherein said first signal is proportional to the square root of said DC power.

5. The apparatus of claim 1 wherein said second signal is proportional to said AC power.

6. The apparatus of claim 1 wherein said second signal is proportional to the square root of said AC power.

7. The apparatus of claim 1 wherein said comparison means comprises means for forming a ratio of said first and second signals, means for forming an average value of said ratio, means for comparing said ratio to said average value of said ratio, and means for comparing said average value to a selected threshold value.

8. The apparatus of claim 1 further comprising a band pass filter coupled to said sensing means, an energy detector coupled to said filter, and an analog-to-digital converter having an input coupled to said energy detector and an output coupled to both of said computing means.

9. The apparatus of claim 8 wherein said band pass filter has a passband between about 30 to 70 KHz.

10. The apparatus of claim 8 wherein said energy detector comprises a full wave rectifier and a low pass filter coupled to said rectifier.

11. The apparatus of claim 10 wherein said low pass filter has a cut-off frequency of about 500 Hz.

12. The apparatus of claim 1 further comprising an alarm coupled to said comparison means.

13. The apparatus of claim 1 wherein said first signal computing means comprises means for forming a sum of a selected number of samples of said vibration signal, and means for dividing said sum by said selected number.

14. The apparatus of claim 1 wherein said first signal computing means comprises means for forming a first product of a first selected constant and a current sample value, means for forming a second product of a second selected constant and a prior sample average, and means for summing said first and second products.

15. The apparatus of claim 14 wherein said first and second constants are about 0.2 and 0.8, respectively.

16. A method for determining the condition of a tool, said method comprising:
    providing a vibration signal by sensing the tool vibration;
    computing a first signal that is a function of the DC power of said vibration signal;
    computing a second signal that is a function of the AC power of said vibration signal; and
    comparing said first and second signals.

17. The method of claim 16 wherein said first signal is proportional to said DC power.

18. The method of claim 16 wherein said first signal is proportional to the square root of said DC power.

19. The method of claim 16 wherein said second signal is proportional to said AC power.

20. The method of claim 16 wherein said second signal is proportional to the square root of said AC power.

21. The method of claim 16 wherein said comparing step comprises forming a ratio of said first and second signals, forming an average value of said ratio, comparing said ratio to said average value of said ratio, and comparing said average value to a selected threshold value.

22. The method of claim 16 further comprising actuating an alarm.

23. The method of claim 16 wherein said first signal computing step comprises forming a sum of a selected number of samples of said vibration signal, and dividing said sum by said selected number.

24. The method of claim 16 wherein said first signal computing step comprises forming a first product of a first selected constant and a current sample value, forming a second product of a second selected constant and a prior sample average, and summing the first and second products.

* * * * *